United States Patent
Housayama

[11] 3,722,913
[45] Mar. 27, 1973

[54] FOLDING BICYCLE

[75] Inventor: Akira Housayama, Komaki, Japan

[73] Assignee: Tsunoda Jitensha Kabushiki Kaisha, Naka-ku, Nagoya-shi, Aichi-ken, Japan

[22] Filed: Feb. 25, 1971

[21] Appl. No.: 118,765

[30] Foreign Application Priority Data

Feb. 27, 1970 Japan .................................. 45/17541
Aug. 8, 1970 Japan .................................. 45/69386

[52] U.S. Cl. .................. 280/287, 280/278, 287/99, 292/106, 292/207, 292/333
[51] Int. Cl. ............................................. B62k 15/00
[58] Field of Search ...... 280/287, 278; 292/106, 207, 292/333; 287/99

[56] References Cited

UNITED STATES PATENTS

| | | | |
|---|---|---|---|
| 3,294,416 | 12/1966 | Carnielli | 280/278 |
| 1,585,144 | 5/1926 | Hannebohn | 292/333 X |
| 1,090,305 | 3/1914 | Hoffman | 292/333 X |
| 2,705,156 | 3/1955 | Torre | 280/287 |
| 3,362,725 | 1/1968 | Dolphin | 280/287 |
| 3,229,797 | 1/1966 | Stackhouse | 292/333 X |
| 2,336,129 | 12/1943 | Sargisson et al. | 292/106 |

Primary Examiner—Kenneth H. Betts
Assistant Examiner—John P. Silverstrim
Attorney—Moonray Kojima

[57] ABSTRACT

Disclosed herein is a folding device for a folding bicycle which comprises a front body frame carrying a front road wheel, a rear body frame carrying a rear road wheel, an extension member secured on the lower portion of the rear body frame to complete the front body frame, and connecting means to connect transversely and swingably the front body frame with the extension member. Provided also to complete the device for simple and easy folding and unfolding, are locking means to fasten the connecting means, holding means to maintain the released position of the locking means, regulating means to control the holding means, and a resilient member to hold the fastening position of the locking means.

9 Claims, 12 Drawing Figures

Patented March 27, 1973

INVENTOR
AKIRA HOUSAYAMA

BY

ATTORNEY

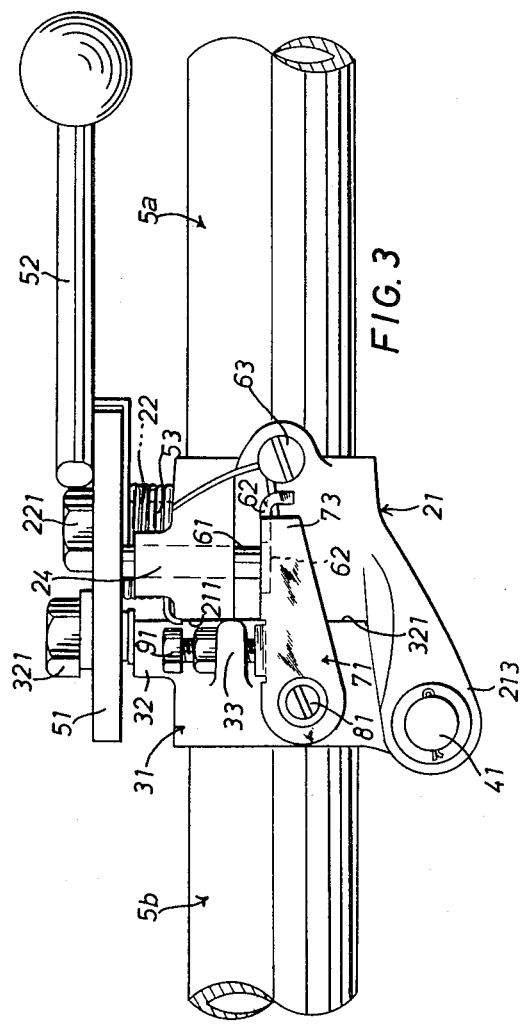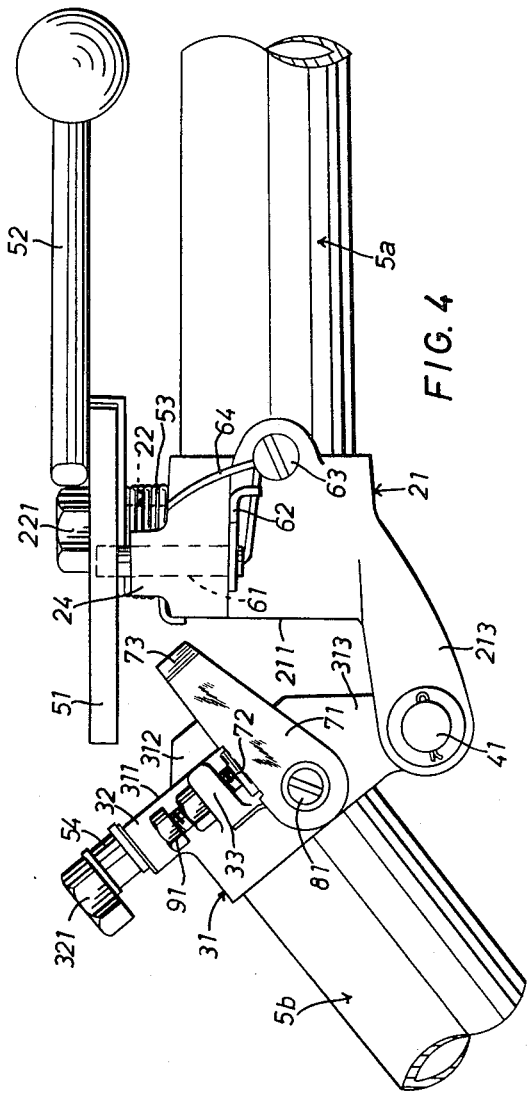

INVENTOR.
AKIRA HOUSAYAMA

FOLDING BICYCLE

The present invention relates to a folding bicycle, and more particularly to a folding device for the body frame of the folding bicycle.

For folding bicycles heretofore in use, bolts and nuts and the like have been adopted to fasten and release foldable body frames. The mentioned fastening and releasing means require, however, such regular tools as spanners, screw-drivers and the like and/or specially-designed tools for completing fastening and releasing the body frames. And further a plurality of operation steps is needed especially in folding the body frames. This makes the fastening and releasing very complicated, troublesome and time-taking.

A first important object of the present invention is, therefore, to provide a folding device for a folding bicycle, which is capable of rendering easy and simple folding by only a simple operation of an operation lever handle provided on the device, and simple assembling by one opening step to set up firmly and automatically the body frames of the bicycle.

A second important object of the present invention is to provide a folding device having the above-mentioned characteristics, wherein one-touch operation completes folding of the body frames of the bicycle.

A third important object of the present invention is to provide a folding device equipped with an operation lever to fasten and release the hinged joint enabling folding of the body frames of the bicycle. Rotation or swing of the operation lever releases the hinged joint and even when the rotation force onto the lever is removed, the lever stays in the rotated position to keep the hinged joint free. This enables very easy folding operation. And one opening step of the folded body frames realizes automatic and very firm assembling of the bicycle.

A fourth important object of the present invention is to provide a folding device having the above-mentioned characteristics, wherein the device is designed to be very simple in its construction and yet very durable and accurate in its operation.

The folding device for a folding bicycle constructed in accordance with the present invention comprises, therefore, a front body frame to carry a front road wheel and a rear body frame to carry a rear road wheel and to mount a saddle at the upper end thereof and a crank-pedal at the lower end thereof. An extension member is interposed between the crank-pedal and the front body frame so as to complete the front body frame. Provided further to complete the folding device are connecting means to connect swingably the front body frame and the extension member, locking means to lock the front body frame to the extension member, holding means to maintain the released position of the locking means, regulating means to control the holding means, and resilient members respectively to urge the locking means and regulating means to their operation positions.

The above-described and other objects and features of the present invention will become more clear from the following detailed description, especially when read in conjunction with the accompanying drawings, in which FIG. 1 is a schematic side view of a folding bicycle equipped with the device in accordance with the present invention.

FIG. 3 depicts the bottom portion of the device in FIG. 2 when seen from the arrow mark direction;

FIG. 4 is a bottom view of the device in the folded situation;

Described below in detail with reference to the accompanying drawings is one preferred embodiment of the device in accordance with the present invention.

Figure 1:
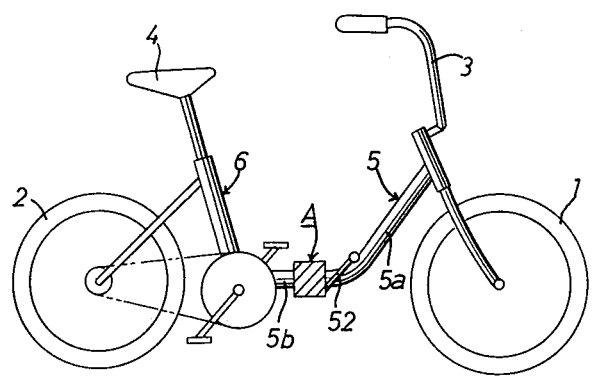

FIG. 1 depicts a folding bicycle equipped with the device A, the bicycle comprising a front road wheel 1, a rear road wheel 2, a handle bar 3, a saddle 4, a front body frame 5 and a rear body frame 6. The contstuction of the device A can best be explained in reference to FIG. 2 through 7, wherein pipe members 5a and 5b forming the front body frame 5 are collapsibly connected each other by hinged points 21 and 31 secured respectively on the ends of the pipe members 5a and 5b. The hinged joint 21 fixed on the end of the pipe member 5a comprises an arm portion 213, 213 in a fork shape, a tapered concave 212 engraved on a engaging face 211 and bosses 22 and 24 jutting out as one piece from a side of the hinged joint 21. And an arm portion 313 of the hinged joint 31 of the pipe member 5b is rotatably received by the arm portion 213, 213 through a holding pin 41. A hook member 51 is made in a plate shape, which has a ratchet portion 511 and an operation lever 52 welded on the base portion thereof. A holding bolt 221 keeps the hook member 51 on the boss 22 jutting out from the side of the hinged joint 21 so that the hook member 51 is rotatable up-and-downward against the device A. A coiled spring 53 biases normally the hook member 51 clockwise in FIG. 2, the coiled spring 53 being fixed on the engaging face 211 of the hinged joint 21 at one end thereof. An engaging annulus 54 is eccentrically fastened by a fastening bolt 321 onto a boss 32 of the hinged joint 31 and, as best shown in FIG. 4, engages removably with the ratchet portion 511 of the hook member 51. A stopper pin 61 is engaged in the boss 24 jutting out from the hinged joint 21 in a transversely movable way on the bottom face of the device A. The stopper pin 61 can go in and out the rotation area of the hook member 51 at a right angle. A curved piece 62 is welded on the base portion of the stopper pin 61 as best shown in FIG. 7. A torque spring 64 biases normally the stopper pin 61 towards the hook member 51, held by a screw 63 threaded in the bottom face of the hinged joint 21.

Figure 2:
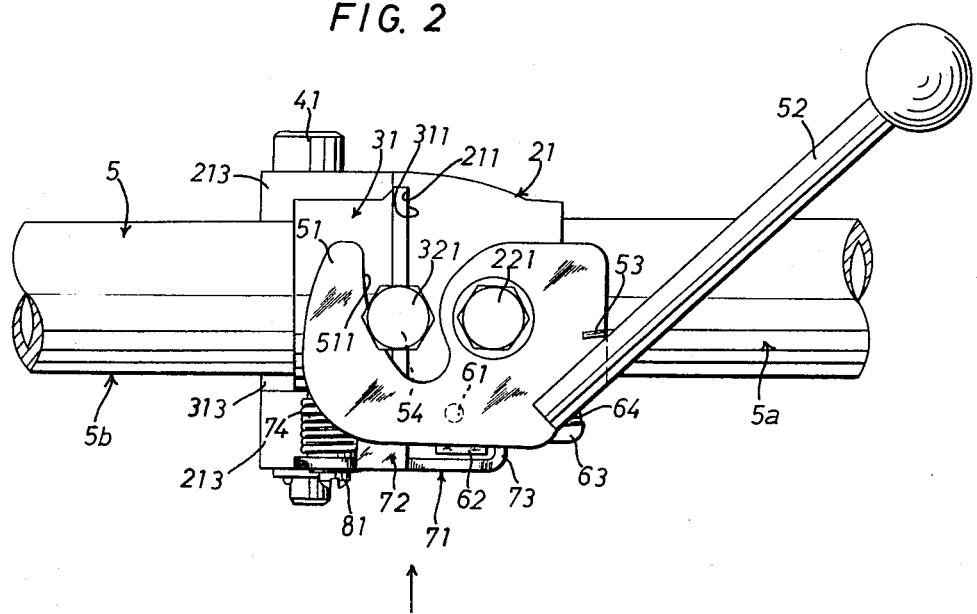
FIG. 2 is a side view of the device in accordance with the present invention.

Thus, when the operation lever 52 turns the hook member 51 counter-clockwise in FIG. 2, the stopper pin 61 juts out inside of the ratchet portion 511 of the hook member 51 to prevent the clockwise rotation of the hook member 51.

Pivoted on the bottom face of the hinged joint 31 through a holding bolt 81 and a holding cylinder 82 is a stopper release lever 71 which is swingable under the device A but normally biased counter-clockwise by a torque spring 74 as FIG. 3 indicates. A curved portion 73 is provided approximately at the base portion of the lever 71, and adjustably controlled thereon is the swing distance of the lever 71 to the counterclockwise direction in FIG. 2 by the top-tip of an adjusting bolt 91 threaded in the boss 33 on the bottom face of the hinged joint 31. When the pipe members 5a and 5b are engaged each other, the curved portion 73 provided approximately at the base portion of the lever 71 is engaged in the upper face of the curved piece 62 of the stopper pin 61 moved transversely against the hook member 51 by the torque spring 64. This engagement acts to press down the stopper pin 61 to release the engagement between the stopper pin 61 and the ratchet portion 511 of the hook member 51. And when the pipe members 5a and 5 b are folded against each other, the curved portion 73 leaves off the curved piece 62 along the bottom face of the curved piece 62.

Figure 5:
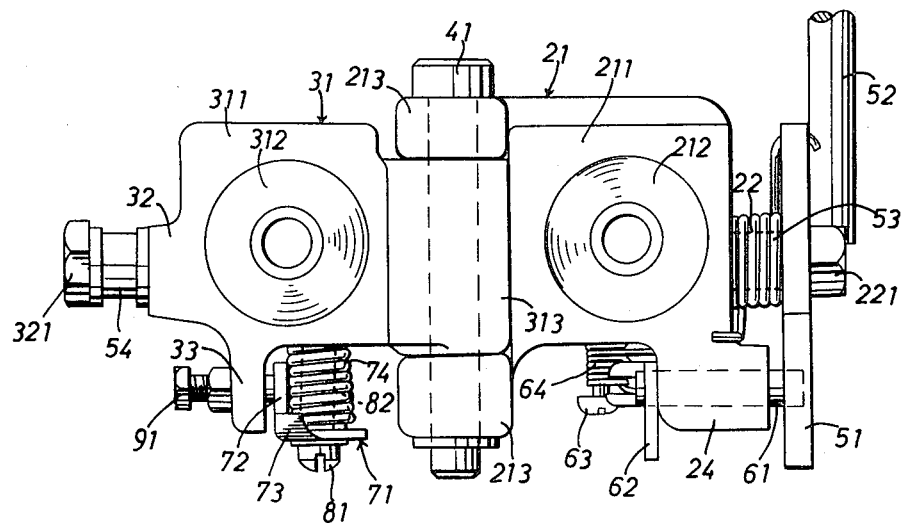
FIG. 5 is a front view of the device when the folding process is completed.

The operation of the above-mentioned embodiment of the device in accordance with the present invention is described heretoafter. First, explained is the procedure of folding the bicycle from the set-up situation as shown in FIG. 1 when the pipe members 5a and 5b forming the front and rear portions of body frame 5 are connected by the device A of the present invention. Referring to FIGS. 2 and 1, the counter-clockwise rotation of the operation lever 52 against the biasing force of the spring 53 releases the engagement between the ratchet portion 511 of the hook member 51 and the engaging annulus 54 of the hinged joint 31. At the same time, the stopper pin 61, which is so far prevented from moving in the inner side of the hook member 51, now juts out inside and engages with the ratchet portion 511 of the hook member 51. Pin 61 may engage in a hole (not shown) in member 51. This holds the operation lever 52 in the released position without returning to the clockwise direction in FIG. 2 even the rotating force is removed from the operation lever 52. And as best shown in FIGS. 4 and 5, the hinged joints 21 and 31 are disengaged to make the pipe member 5a collapsible against the pipe member 5b. At the same time, the curved portion 73 of the lever 71 is removed along the bottom face of the curved piece 62 of the stopper pin 61 so that the lever 72 causes no inconvenience in folding the body frames of the bicycle.

A very easy single work is good enough to unfold or assemble the bicycle. The ridder of the bicycle holds the folded pipe members 5a and 5b by his hands and turns them so as to connect the two pipe members 5a and 5b together. Then, prior to the engagement between the hinged joints 21 and 31, the curved portion 73 of the lever 71 on the hinged joint 31 is placed upon the upper face of the curved piece 62 of the stopper pin 61 as shown in FIG. 4 to press down the stopper pin 61 against biasing force of the torque spring 64. This frees the hook member 51 which is so far arrested by the top-tip of the stopper pin 61 and the hook member 51 turns clockwise in FIG. 2 by urging power of the torque spring 53 to have the engaging annulus 54 of the hinged joint 31 comming inside and engage with the ratchet portion 511 thereof. Then, the pipe members 5a and 5b are firmly engaged each other and the body frames are automatically assembled.

As described heretofore, with the device A of the present invention, the rotation of the hook member 51 is prevented by the stopper pin 61 when the ratchet portion 511 of the hook member 51 is disengaged from the engaging annulus 54 by operation of the operation lever 52 secured on the hook member 51. And while the engagement between the ratchet portion of the hook member 51 and the engaging annulus 54 is maintained, the stopper pin 61 is automatically separated from the hook member 51. This enables folding the bicycle only by simple operation of the operation lever 52 and assembling very firmly the bicycle only by turning the body frames to the unfolded positions.

Figure 8:
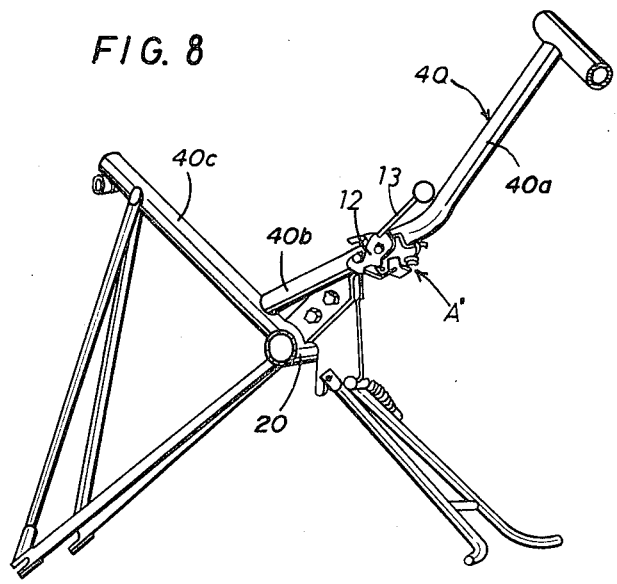
FIG. 8 is an oblique view of the body portion of a folding bicycle equipped with a second embodiment in accordance with the present invention.
Figure 9:
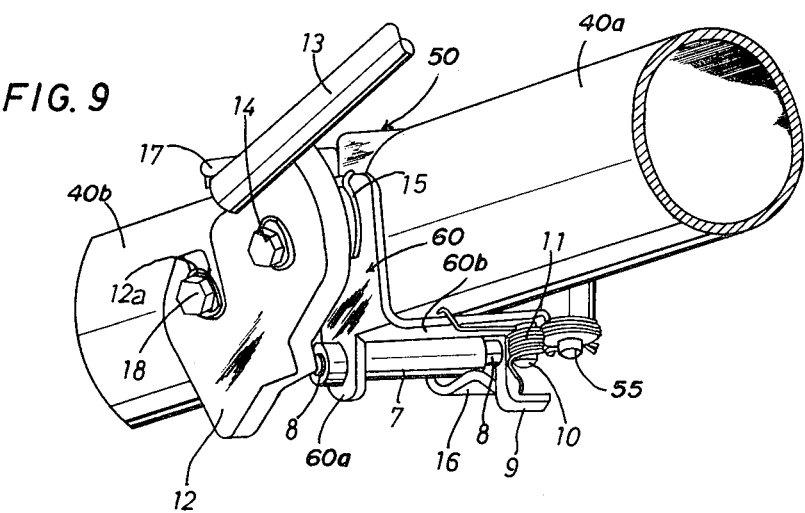
FIG. 9 is an oblique view of the left side of the device adopted in FIG. 8.

Another embodiment of the present invention is described below with reference to FIGS. 8 through 12. FIG. 8 shows the body construction of a folding bicycle equipped with the device A', the body comprising a rear body frame 40c to carry a rear road wheel, a crankshaft receiver 20 to journal a crank-pedal, and a front body frame 40 to carry a front road wheel. The construction of the device A' can best be explained in reference to FIGS. 9 through 12, wherein pipe members 40a and 40b forming the front body frame 40 are collapsibly connected each other with a hinged joint assembly 50. The hinged joint assembly 50 comprises joints 50a and 50b swingably connected each other with a joint axle 55 and respectively secured on the ends of the pipe members 40a and 40b. A L-letter shape piece 60 is firmly secured on the leftside of the pipe member 40a as best shown in FIG. 9 and is in contact with the hinged joint 50a, the L-letter shape piece 60 having a perpendicular portion 60a and the horizontal portion 60b thereof extending beneath the pipe member 40a.

Figure 10:
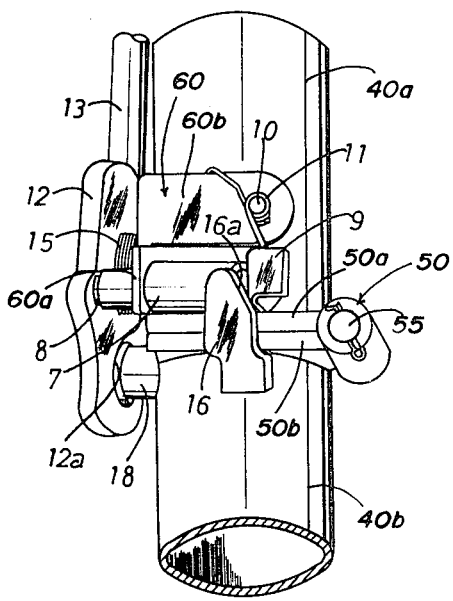
FIG. 10 is an oblique view of the bottom side of the device adopted in FIG. 8.

A guiding pipe member 7 is fixed on the bottom side of the pipe member 40a, engaging one end thereof with the perpendicular portion 60a of the L-letter shape piece 60. A stopper pin 8 is slidably inserted in the guiding pipe member 7 and a small L-letter shape piece 9 is fixed on the right end of the stopper pin 8 as best shown in FIG. 10. A torsion coil spring 11 is wound on a boss or shaft 10 jutting out from the bottom side of the horizontal portion 60b of the L-letter shape piece 60, the torsion coil spring 11 having one end thereof hung on the one side of the horizontal portion 60b and the other end thereof on the small L-letter shape piece 9 as best shown in FIG. 10. Thus, in reference to FIG. 12, the torsion coil spring 11 biases normally the stopper pin 8 so that the top-tip of the stopper pin 8 juts out from the guiding pipe member 7.

A hook member 12 is provided with an operation lever 13 at the upper end thereof and a ratchet portion 12a at the lower end thereof, being rotatably journalled on the L-letter shape piece 60 by an axle 14. A torsion coil spring 15 is wound on the axle 14, having one end thereof hung on the L-letter shape piece 60 and the other end 15a thereof on the hook member 12. A control plate 16 is fixed on the jointing end of the pipe

FOLDING BICYCLE

The present invention relates to a folding bicycle, and more particularly to a folding device for the body frame of the folding bicycle.

For folding bicycles heretofore in use, bolts and nuts and the like have been adopted to fasten and release foldable body frames. The mentioned fastening and releasing means require, however, such regular tools as spanners, screw-drivers and the like and/or specially-designed tools for completing fastening and releasing the body frames. And further a plurality of operation steps is needed especially in folding the body frames. This makes the fastening and releasing very complicated, troublesome and time-taking.

A first important object of the present invention is, therefore, to provide a folding device for a folding bicycle, which is capable of rendering easy and simple folding by only a simple operation of an operation lever handle provided on the device, and simple assembling by one opening step to set up firmly and automatically the body frames of the bicycle.

A second important object of the present invention is to provide a folding device having the above-mentioned characteristics, wherein one-touch operation completes folding of the body frames of the bicycle.

A third important object of the present invention is to provide a folding device equipped with an operation lever to fasten and release the hinged joint enabling folding of the body frames of the bicycle. Rotation or swing of the operation lever releases the hinged joint and even when the rotation force onto the lever is removed, the lever stays in the rotated position to keep the hinged joint free. This enables very easy folding operation. And one opening step of the folded body frames realizes automatic and very firm assembling of the bicycle.

A fourth important object of the present invention is to provide a folding device having the above-mentioned characteristics, wherein the device is designed to be very simple in its construction and yet very durable and accurate in its operation.

The folding device for a folding bicycle constructed in accordance with the present invention comprises, therefore, a front body frame to carry a front road wheel and a rear body frame to carry a rear road wheel and to mount a saddle at the upper end thereof and a crank-pedal at the lower end thereof. An extension member is interposed between the crank-pedal and the front body frame so as to complete the front body frame. Provided further to complete the folding device are connecting means to connect swingably the front body frame and the extension member, locking means to lock the front body frame to the extension member, holding means to maintain the released position of the locking means, regulating means to control the holding means, and resilient members respectively to urge the locking means and regulating means to their operation positions.

The above-described and other objects and features of the present invention will become more clear from the following detailed description, especially when read in conjunction with the accompanying drawings, in which FIG. 1 is a schematic side view of a folding bicycle equipped with the device in accordance with the present invention.

Figure 6:
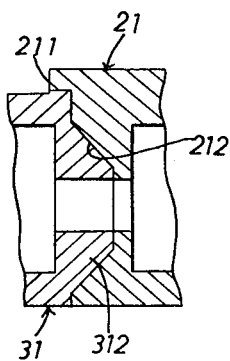
FIG. 6 is a partial sectional view showing the engagement of the hinged joint portion of the device.
Figure 7:
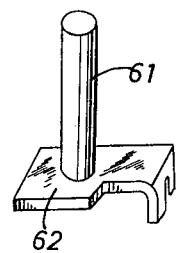
FIG. 7 is a perspective view of the stopper pin of the device.
Figure 11:
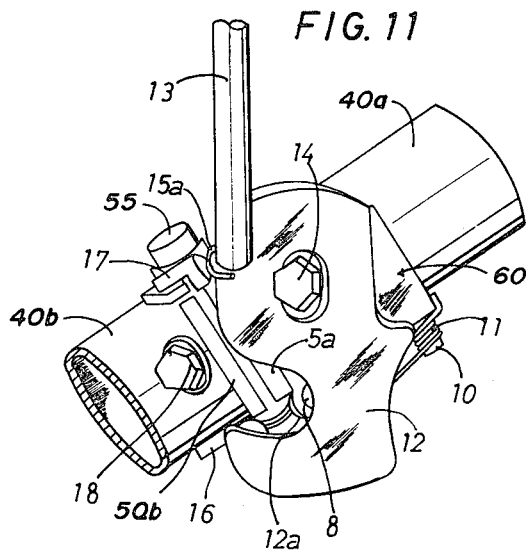
FIG. 11 is an oblique view of the left side of the device adopted in FIG. 8 at the initial stage of the folding operation.
Figure 12:
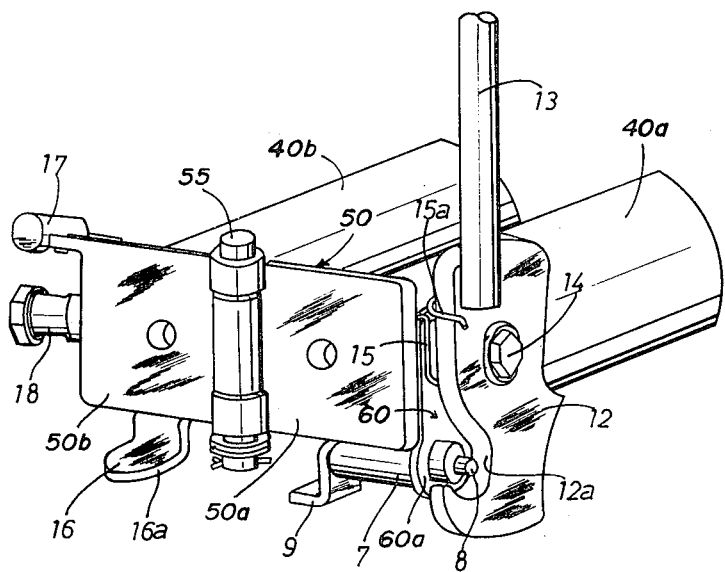
FIG. 12 is an oblique view of the device adopted in FIG. 8 at the completion of the folding operation.

FIG. 2 is a side view of the device in accordance with the present invention;

FIG. 3 depicts the bottom portion of the device in FIG. 2 when seen from the arrow mark direction;

FIG. 4 is a bottom view of the device in the folded situation;

FIG. 5 is a front view of the device when the folding process is completed;

FIG. 6 is a partial sectional view showing the engagement of the hinged joint portion of the device;

FIG. 7 is a perspective view of the stopper pin of the device;

FIG. 8 is an oblique view of the body portion of a folding bicycle equipped with a second embodiment in accordance with the present invention;

FIG. 9 is an oblique view of the left side of the device adopted in FIG. 8;

FIG. 10 is an oblique view of the bottom side of the device adopted in FIG. 8;

FIG. 11 is an oblique view of the left side of the device adopted in FIG. 8 at the initial stage of the folding operation;

FIG. 12 is an oblique view of the device adopted in FIG. 8 at the completion of the folding operation.

Described below in detail with reference to the accompanying drawings is one preferred embodiment of the device in accordance with the present invention.

FIG. 1 depicts a folding bicycle equipped with the device A, the bicycle comprising a front road wheel 1, a rear road wheel 2, a handle bar 3, a saddle 4, a front body frame 5 and a rear body frame 6. The contstuction of the device A can best be explained in reference to FIG. 2 through 7, wherein pipe members 5a and 5b forming the front body frame 5 are collapsibly connected each other by hinged points 21 and 31 secured respectively on the ends of the pipe members 5a and 5b. The hinged joint 21 fixed on the end of the pipe member 5a comprises an arm portion 213, 213 in a fork shape, a tapered concave 212 engraved on a engaging face 211 and bosses 22 and 24 jutting out as one piece from a side of the hinged joint 21. And an arm portion 313 of the hinged joint 31 of the pipe member 5b is rotatably received by the arm portion 213, 213 through a holding pin 41. A hook member 51 is made in a plate shape, which has a ratchet portion 511 and an operation lever 52 welded on the base portion thereof. A holding bolt 221 keeps the hook member 51 on the boss 22 jutting out from the side of the hinged joint 21 so that the hook member 51 is rotatable up-and-downward against the device A. A coiled spring 53 biases normally the hook member 51 clockwise in FIG. 2, the coiled spring 53 being fixed on the engaging face 211 of the hinged joint 21 at one end thereof. An engaging annulus 54 is eccentrically fastened by a fastening bolt 321 onto a boss 32 of the hinged joint 31 and, as best shown in FIG. 4, engages removably with the ratchet portion 511 of the hook member 51. A stopper pin 61 is engaged in the boss 24 jutting out from the hinged joint 21 in a transversely movable way on the bottom face of the device A. The stopper pin 61 can go in and out the rotation area of the hook member 51 at a right angle. A curved piece 62 is welded on the base portion of the stopper pin 61 as best shown in FIG. 7. A torque spring 64 biases normally the stopper pin 61 towards the hook member 51, held by a screw 63 threaded in the bottom face of the hinged joint 21.

Thus, when the operation lever 52 turns the hook member 51 counter-clockwise in FIG. 2, the stopper pin 61 juts out inside of the ratchet portion 511 of the hook member 51 to prevent the clockwise rotation of the hook member 51.

Pivoted on the bottom face of the hinged joint 31 through a holding bolt 81 and a holding cylinder 82 is a stopper release lever 71 which is swingable under the device A but normally biased counter-clockwise by a torque spring 74 as FIG. 3 indicates. A curved portion 73 is provided approximately at the base portion of the lever 71, and adjustably controlled thereon is the swing distance of the lever 71 to the counterclockwise direction in FIG. 2 by the top-tip of an adjusting bolt 91 threaded in the boss 33 on the bottom face of the hinged joint 31. When the pipe members 5a and 5b are engaged each other, the curved portion 73 provided approximately at the base portion of the lever 71 is engaged in the upper face of the curved piece 62 of the stopper pin 61 moved transversely against the hook member 51 by the torque spring 64. This engagement acts to press down the stopper pin 61 to release the engagement between the stopper pin 61 and the ratchet portion 511 of the hook member 51. And when the pipe members 5a and 5 b are folded against each other, the curved portion 73 leaves off the curved piece 62 along the bottom face of the curved piece 62.

The operation of the above-mentioned embodiment of the device in accordance with the present invention is described hereotafter. First, explained is the procedure of folding the bicycle from the set-up situation as shown in FIG. 1 when the pipe members 5a and 5b forming the front and rear portions of body frame 5 are connected by the device A of the present invention. Referring to FIGS. 2 and 1, the counter-clockwise rotation of the operation lever 52 against the biasing force of the spring 53 releases the engagement between the ratchet portion 511 of the hook member 51 and the engaging annulus 54 of the hinged joint 31. At the same time, the stopper pin 61, which is so far prevented from moving in the inner side of the hook member 51, now juts out inside and engages with the ratchet portion 511 of the hook member 51. Pin 61 may engage in a hole (not shown) in member 51. This holds the operation lever 52 in the released position without returning to the clockwise direction in FIG. 2 even the rotating force is removed from the operation lever 52. And as best shown in FIGS. 4 and 5, the hinged joints 21 and 31 are disengaged to make the pipe member 5a collapsible against the pipe member 5b. At the same time, the curved portion 73 of the lever 71 is removed along the bottom face of the curved piece 62 of the stopper pin 61 so that the lever 72 causes no inconvenience in folding the body frames of the bicycle.

A very easy single work is good enough to unfold or assemble the bicycle. The ridder of the bicycle holds the folded pipe members 5a and 5b by his hands and turns them so as to connect the two pipe members 5a and 5b together. Then, prior to the engagement between the hinged joints 21 and 31, the curved portion 73 of the lever 71 on the hinged joint 31 is placed upon the upper face of the curved piece 62 of the stopper pin 61 as shown in FIG. 4 to press down the stopper pin 61 against biasing force of the torque spring 64. This frees the hook member 51 which is so far arrested by the top-tip of the stopper pin 61 and the hook member 51 turns clockwise in FIG. 2 by urging power of the torque spring 53 to have the engaging annulus 54 of the hinged joint 31 comming inside and engage with the ratchet portion 511 thereof. Then, the pipe members 5a and 5b are firmly engaged each other and the body frames are automatically assembled.

As described heretofore, with the device A of the present invention, the rotation of the hook member 51 is prevented by the stopper pin 61 when the ratchet portion 511 of the hook member 51 is disengaged from the engaging annulus 54 by operation of the operation lever 52 secured on the hook member 51. And while the engagement between the ratchet portion of the hook member 51 and the engaging annulus 54 is maintained, the stopper pin 61 is automatically separated from the hook member 51. This enables folding the bicycle only by simple operation of the operation lever 52 and assembling very firmly the bicycle only by turning the body frames to the unfolded positions.

Another embodiment of the present invention is described below with reference to FIGS. 8 through 12. FIG. 8 shows the body construction of a folding bicycle equipped with the device A', the body comprising a rear body frame 40c to carry a rear road wheel, a crankshaft receiver 20 to journal a crank-pedal, and a front body frame 40 to carry a front road wheel. The construction of the device A' can best be explained in reference to FIGS. 9 through 12, wherein pipe members 40a and 40b forming the front body frame 40 are collapsibly connected each other with a hinged joint assembly 50. The hinged joint assembly 50 comprises joints 50a and 50b swingably connected each other with a joint axle 55 and respectively secured on the ends of the pipe members 40a and 40b. A L-letter shape piece 60 is firmly secured on the leftside of the pipe member 40a as best shown in FIG. 9 and is in contact with the hinged joint 50a, the L-letter shape piece 60 having a perpendicular portion 60a and the horizontal portion 60b thereof extending beneath the pipe member 40a.

A guiding pipe member 7 is fixed on the bottom side of the pipe member 40a, engaging one end thereof with the perpendicular portion 60a of the L-letter shape piece 60. A stopper pin 8 is slidably inserted in the guiding pipe member 7 and a small L-letter shape piece 9 is fixed on the right end of the stopper pin 8 as best shown in FIG. 10. A torsion coil spring 11 is wound on a boss or shaft 10 jutting out from the bottom side of the horizontal portion 60b of the L-letter shape piece 60, the torsion coil spring 11 having one end thereof hung on the one side of the horizontal portion 60b and the other end thereof on the small L-letter shape piece 9 as best shown in FIG. 10. Thus, in reference to FIG. 12, the torsion coil spring 11 biases normally the stopper pin 8 so that the top-tip of the stopper pin 8 juts out from the guiding pipe member 7.

A hook member 12 is provided with an operation lever 13 at the upper end thereof and a ratchet portion 12a at the lower end thereof, being rotatably journalled on the L-letter shape piece 60 by an axle 14. A torsion coil spring 15 is wound on the axle 14, having one end thereof hung on the L-letter shape piece 60 and the other end 15a thereof on the hook member 12. A control plate 16 is fixed on the jointing end of the pipe member 40b at the bottom side so that the control plate 16 can regulate sliding movements of the stopper pin 8 within the guiding pipe member 7 by engagement and disengagement of the side edge 16a of the control plate 16 with and from the small L-letter shape piece 9. The hinged joint 50b has at the upper outer edge thereof a boss 17 which can engage with the upper side edge of the hook member 12, and at the left side thereof an engaging bolt 18 to engage with the ratchet portion 12a of the hook member 12.

Described below is the operation of the above-explained second embodiment of the present invention. First, while the device A' is in the unfolded or assembled situation as best shown in FIGS. 9 and 10, the hinged joints 50a and 50b are pressed to be in contact each other. This holds, in turn, the assembled connection between the pipe members 40a and 40b. The side edge 16a of the control plate 16 urges the small L-letter shape piece 9 against biasing force of the torsion coil spring 11 so as to keep the stopper pin 8 remaining within the guiding pipe member 7. The torsion coil spring 15 causes engagement between the ratchet portion 12a of the hook member 12 with the engaging bolt 18, which holds the operation lever 13 in the pushed down position. The torsion coil spring 15 is so designed as to have strong biasing force well enough to produce firm engagement of the ratchet portion 12a of the hook member 12 with the engaging bolt 18, which enables strong assembled connection between the pipe members 40a and 40b.

The procedure of folding the bicycle from the unfolded situation as described above is carried out first by pulling up the operation lever 13 to produce counter-clockwise rotation of the hook member 12 around the axle 14. At the initial stage of the rotation, the engaging bolt 18 disengages from the ratchet portion 12a of the hook member 12 and the upper side edge of the hook member 12 gets in contact with the boss 17 provided on the upper outer edge of the hinged joint 50b. A further rotation of the hook member 12 by continuous upward pulling of the operation lever 13 makes the upper side edge of the hook member 12 press the boss 17 to have the hinged joint 50d leave off from the hinged joint 50b, the open situation of the hinged joint assembly 50 remaining as best shown in FIG. 11. When the hook member 12 is further more rotated, the hinged joint 50a leaves off more from the hinged joint 50b so that the control plate 16 urging so far the small L-letter shape piece 9 now disengages from the small L-letter shape piece 9. This releases the biasing force of the torsion coil spring 11 and the stopper pin 8 juts out in the ratchet portion 12a of the hook member 12. The hook member 12 is now held in the released position by the stopper pin 8 and cannot return to the original or pushed down position thereof even when the force actuating onto the operation lever 13 is removed. Then, the front body frame 40 can manually be folded with ease to the folded situation as illustrated in FIG. 12.

A very easy work is good enough to unfold or assemble the bicycle. The bicycle ridder holds the folded pipe members 40a and 40b by his hands and turns them so as to connect them together. Then, prior to engagement between the hinged joints 50a and 50b, the side edge 16a of the control plate 16 urges the small L-letter shape piece 9 against biasing force of the torsion coil spring 11 to withdraw the stopper pin 8 within the guiding pipe member 7. Then, the hook member 12 rotates clockwise by the biasing force of the torsion spring 15 so that the ratchet portion 12a of the hook member 12 engages firmly with the engaging bolt 18. Consequently, the pipe members 40a and 40b are firmly connected as shown in FIGS. 9 and 10.

The above described second embodiment is naturally provided with the features and advantages as explained in the previous preferred embodiment. And furthermore, this second embodiment has such an advantage that in folding operation, the hinged joint assembly is forced to open by rotation of the hook member, which makes the folding operation of heavy bicycles very easy and prevents the body frames from being scratched and damaged by friction and warpping force.

It is understood that within the principle of the present invention various details can be widely modified from the preferred embodiment described and illustrated in the above without departing from the spirit and scope of the present invention.

What is claimed is:

1. Device for locking and unlocking a folding cycle comprising a front frame portion and a rear frame portion rotatably hinged together about a common axis, said device comprising
   a. hooked means rotatably attachable to one of said frames and rotatable in a plane perpendicular to the direction of movement of said frames about said common axis;
   b. post means attachable to the other of said frames;
   c. lever means attachable to said hooked means for rotating said hooked means to engage with or disengage from said post means;
   d. holding means on said one frame for normally holding said hooked means in a disengaged position, said holding means comprising a rod extending perpendicular to said plane plate means attached to the end of said rod and spring means for normally holding said rod in intersection with said plane;
   e. release means attachable to said other frame for causing said holding means to allow said lever means to move said hooked means into engagement with said post means, said release means comprising means positioned on said other frame for engaging and moving said plate means and thereby cause said rod to disengage from said hooked means.

2. Device for locking and unlocking a folding cycle comprising a front frame portion and a rear frame portion rotatably hinged together about a common axis, said device comprising
   a. hooked means rotatably attachable to one of said frames and rotatable in a plane perpendicular to the direction of movement of said frames about said common axis;
   b. post means attachable to the other of said frames;
   c. lever means attachable to said hooked means for rotating said hooked means to engage with or disengage from said post means;
   d. holding means on said one frame for normally holding said hooked means in a disengaged position, said holding means comprising a rod extending perpendicular to said plane, spring means for normally holding said rod in intersection with said plane and a rigid piece attached to one end of said rod; and e. release means attachable to said other frame for causing said holding means to allow said lever means to move said hooked means into engagement with said post means, said release means comprising a tapered plate positioned on said other frame, whereby closing said frames causes said tapered plate to engage and move said rigid piece against the bias of said spring and out of said plane.

3. Device of claim 2, wherein said hooked means comprises a flat plate means having a body portion and an extended portion defining a catch, said body portion being rotatably attached to said one frame, and wherein said lever means is attached to said body portion for rotating said flat plane means.

4. Device of claim 2, wherein said hooked means comprises a body portion and an extended portion to form a hooked space therebetween for engaging said post means, said body having a hole therein, and wherein said rod normally is inserted in said hole.

5. Device of claim 2, wherein said hooked means comprises a body portion and an extended hooked portion with a space therebetween for engaging said post means, and wherein said rod normally is engaged in said space.

6. Device for locking and unlocking a folding cycle comprising a front frame portion and a rear frame portion rotatably hinged together about a common axis, said device comprising a. hooked means rotatably attachable to one of said frames and rotatable in a plane perpendicular to the direction of movement of said frames about said common axis;

b. post means attachable to the other of said frames;

c. lever means attachable to said hooked means for rotating said hooked means to engage with or disengage from said post means;

d. holding means on said one frame for normally holding said hooked means in a disengaged position, said holding means comprising a rigid piece having a perpendicularly disposed portion, a rod extending perpendicular to said plane, spring means for holding said rod in intersection with said plane, said piece being attachable to said rod; and e. release means attachable to said other frame for causing said holding means to allow said lever means to move said hooked means into engagement with said post means, said release means comprising a rigid plate adjustably held to said other frame, said rigid plate being shaped to fit said perpendicularly disposed portion, whereby closing of said frames causes said plate to engage said piece thereby to cause said rod to disengage from said hooked means.

7. Device of claim 6, wherein said hooked means comprises a flat plate means having a body portion and an extended portion defining a catch, said body portion being rotatably attached to said one frame, and wherein said lever means is attached to said body portion for rotating said flat plate means.

8. Device of claim 6, wherein said hooked means comprises a body portion and an extended portion to form a hooked space therebetween for engaging said post means, said body having a hole therein, and wherein said rod normally is inserted in said hole.

9. Device of claim 6, wherein said hooked means comprises a body portion and an extended hooked portion with a space therebetween for engaging said post means and wherein said rod normally is engaged in said space.

* * * * *